United States Patent
Chang

(10) Patent No.: US 9,992,848 B2
(45) Date of Patent: *Jun. 5, 2018

(54) LIGHTING CONTROL METHOD AND DEVICE

(71) Applicant: Fong-min Chang, Diamond Bar, CA (US)

(72) Inventor: Fong-min Chang, Diamond Bar, CA (US)

( * ) Notice: Subject to any disclaimer, the term of this patent is extended or adjusted under 35 U.S.C. 154(b) by 910 days.

This patent is subject to a terminal disclaimer.

(21) Appl. No.: 13/957,321

(22) Filed: Aug. 1, 2013

(65) Prior Publication Data

US 2015/0035454 A1    Feb. 5, 2015

(51) Int. Cl.
*H05B 37/02* (2006.01)
*H05B 33/08* (2006.01)

(52) U.S. Cl.
CPC ..... *H05B 37/0227* (2013.01); *H05B 33/0842* (2013.01); *H05B 37/02* (2013.01); *Y02B 20/19* (2013.01); *Y02B 20/383* (2013.01)

(58) Field of Classification Search
None
See application file for complete search history.

(56) References Cited

U.S. PATENT DOCUMENTS

| | | | |
|---|---|---|---|
| 4,322,632 A * | 3/1982 | Hart | H02J 13/0048 307/41 |
| 4,695,739 A | 9/1987 | Pierce | |
| 4,777,384 A * | 10/1988 | Altenhof | G04F 1/005 307/141 |
| 4,837,455 A | 6/1989 | Sleator | |
| 4,839,562 A * | 6/1989 | Francis | H05B 37/0281 315/129 |
| 5,030,890 A * | 7/1991 | Johnson | H02M 5/2573 315/208 |
| 5,272,418 A | 12/1993 | Howe et al. | |
| 5,477,113 A * | 12/1995 | Christoffersson | H05B 39/041 307/140 |
| 5,798,620 A * | 8/1998 | Wacyk | H05B 41/36 315/209 R |
| 6,242,872 B1 | 6/2001 | Ha | |
| 6,488,388 B2 | 12/2002 | Jones | |
| 6,696,971 B2 | 2/2004 | Tukin | |
| 7,038,399 B2 | 5/2006 | Lys et al. | |
| 7,466,239 B2 | 12/2008 | Lewis | |
| 8,183,798 B2 | 5/2012 | Mayer et al. | |

(Continued)

*Primary Examiner* — Douglas W Owens
*Assistant Examiner* — Jianzi Chen
(74) *Attorney, Agent, or Firm* — Tran & Associates

(57) ABSTRACT

The present disclosure relates to a method and apparatus for controlling an illumination device, such as a light bulb, LED light, or the like. In one embodiment, a lighting control adapter is described, comprising a male base for physically attaching the lighting control adapter to a light fixture and for receiving power from the light fixture via a light switch connected to the light fixture, a female socket for receiving a base of an illumination device, a switching circuit for providing switchable power to the illumination device, and a processing circuit coupled to the switching circuit, for detecting one or more power toggles of the power received by the male base, and for controlling illumination of the illumination device based on the detection of one or more detected toggles.

23 Claims, 7 Drawing Sheets

(56) References Cited

U.S. PATENT DOCUMENTS

| | | | |
|---|---|---|---|
| 8,294,379 B2 | 10/2012 | Liu et al. | |
| 8,328,582 B1* | 12/2012 | Carley | H01R 33/94 |
| | | | 439/642 |
| 8,853,950 B1* | 10/2014 | Chang | H05B 37/02 |
| | | | 315/119 |
| 2007/0195526 A1 | 8/2007 | Downling et al. | |
| 2007/0206375 A1* | 9/2007 | Piepgras | A43B 1/0027 |
| | | | 362/147 |
| 2008/0001551 A1 | 1/2008 | Abbondanzio et al. | |
| 2008/0157939 A1* | 7/2008 | Sutardja | H05B 37/0254 |
| | | | 340/12.33 |
| 2008/0259597 A1 | 10/2008 | Safford et al. | |
| 2010/0148691 A1* | 6/2010 | Kuo | H05B 33/0815 |
| | | | 315/291 |
| 2010/0182785 A1* | 7/2010 | Stambaugh | G06F 3/0202 |
| | | | 362/235 |
| 2010/0244735 A1 | 9/2010 | Buelow, II | |
| 2010/0289430 A1 | 11/2010 | Stelzer et al. | |
| 2011/0121654 A1 | 5/2011 | Recker et al. | |
| 2012/0043889 A1 | 2/2012 | Recker et al. | |
| 2012/0139446 A1* | 6/2012 | Koren | H05B 33/0842 |
| | | | 315/297 |
| 2013/0038219 A1 | 2/2013 | Dau et al. | |

* cited by examiner

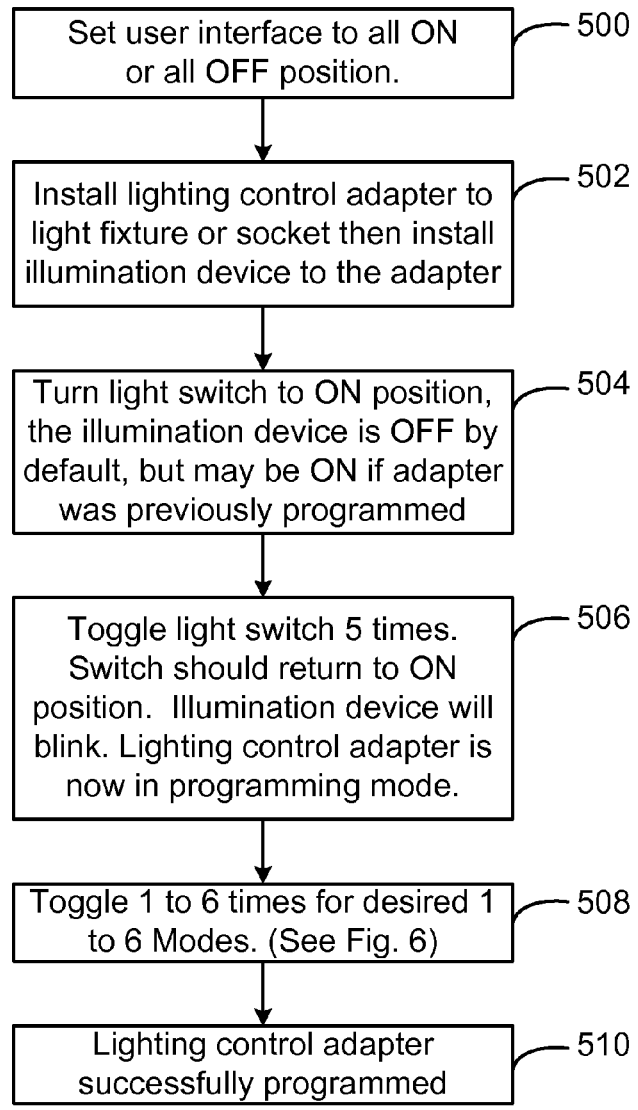

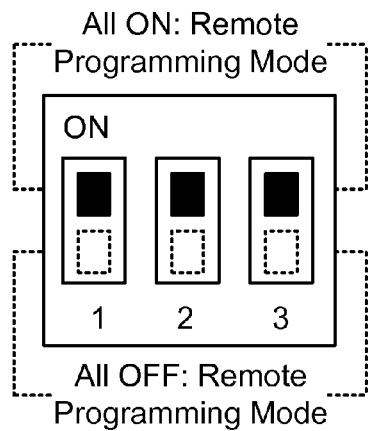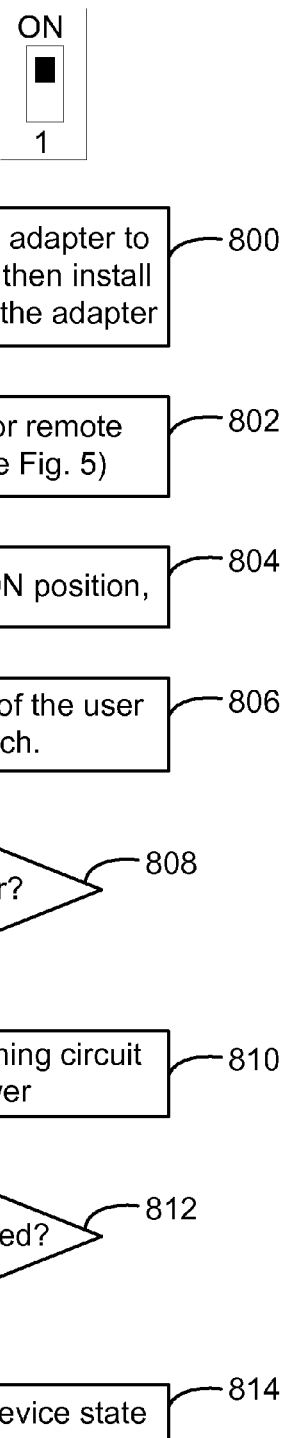

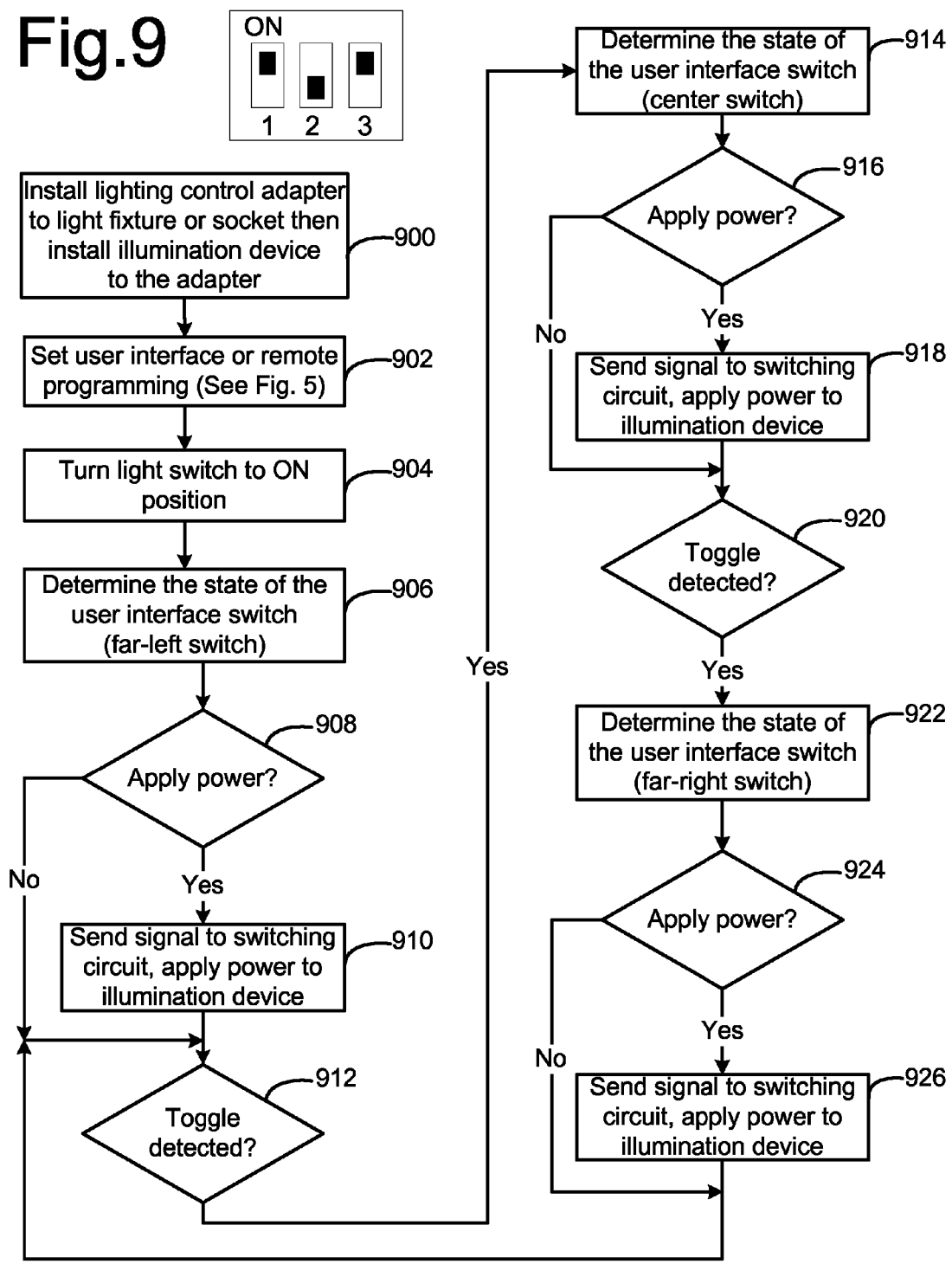

LIGHTING CONTROL METHOD AND DEVICE

TECHNICAL FIELD

The present invention relates to the field of electrical lighting, and more specifically to improved methods to control electric lighting.

BACKGROUND

The basic components of a typical lighting application consist of plurality of lights controlled by a single switch. In such an application, all of the lights controlled by the switch are turned ON or OFF simultaneously. This results in several drawbacks, such as wasted energy, unnecessary dispersion of light, and excessive brightness at night.

Methods have been suggested to provide more flexibility to group lighting arrangements due to their inability to be turned ON/OFF individually. These methods include installing additional light/dimmer switches, installation of wireless remote-controlled apparatus/light fixtures, or timer/motion activated adapters, which in general are costly or simply do not work well in real world applications.

It would be desirable to control lights individually in an existing group of lights that are operated in tandem with one another without having to install additional light switches, or otherwise purchase expensive after-market products that often to not provide the benefit for which they are intended.

SUMMARY

The present disclosure relates to a method and apparatus for controlling an illumination device, such as a light bulb, LED light, or the like. In one embodiment, a lighting control adapter comprising, a male base for physically attaching the lighting control adapter to a light fixture and for receiving power from the light fixture via a light switch connected to the light fixture, a female socket for receiving a base of an illumination device, a switching circuit for providing switchable power to the illumination device, and the processing circuit, coupled to the switching circuit, for detecting one or more power toggles of the power received by the male base, and for controlling illumination of the illumination device based on the detection of one or more detected toggles.

In another embodiment, an electrical lighting control circuit is described, comprising an input for receiving voltage from a light switch, an output for energizing or de-energizing an illumination device, a memory for storing a first number of cyclic voltage changes needed to energize the illumination device, a switching circuit coupled to the output for switchably providing the voltage to the illumination device, and a processing circuit coupled to the switching circuit, for detecting one or more cyclic changes in the voltage received by the input, and for providing a signal to the switching circuit for the switching circuit to energize the illumination device if a number of cyclic voltage changes are detected that match the first number of cyclic voltage changes stored in the memory.

Various advantages of this invention will become apparent to those skilled in the art from the following detailed description of the various and preferred embodiments, when read in light of the accompanying drawings.

BRIEF DESCRIPTION OF THE DRAWINGS

FIG. 5 is a flowchart showing the programming procedure of the present invention;

FIG. 6 is a lookup table used for programming depicted in FIG. 5;

FIG. 7 is a three-switch user interface switch set to programmable mode with all switches set to "ON" position and to "OFF" position depicted in phantom;

FIG. 8 is a flowchart of the present invention with a single user interface switch;

FIG. 9 is a flowchart of the present invention with a three-switch user interface switch;

DETAILED DESCRIPTION

Figure 1:
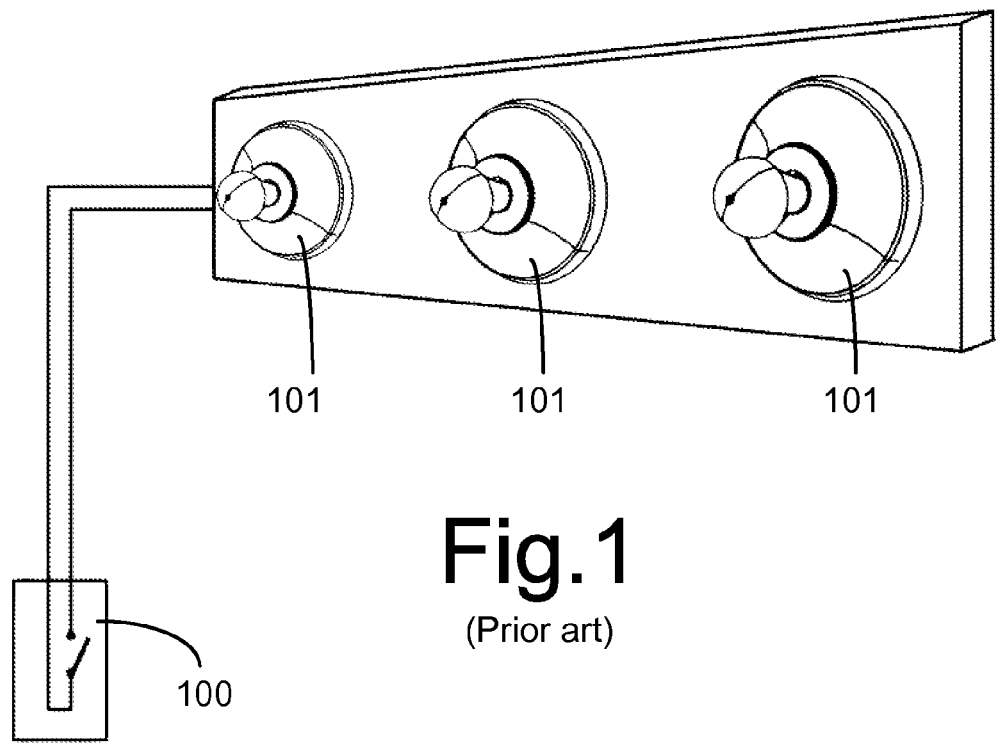
FIG. 1 is a perspective view showing a conventional light application where one light switch controls a group of fixtures.

The detailed description set forth below in connection with the appended drawings is intended as a description of various and preferred embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure With reference to FIG. 1, there is depicted a typical, prior art lighting application consisting, in this example, of three light fixtures 101 controlled by a single light switch 100. Light switch 100 is typically a single-pole-single-throw (SPST) switch, which connects, interrupts, or disconnects power to one or more devices connected thereto, such as the three light fixtures 101.

When light switch 100 is turned ON by a user, a switch contact inside light switch 100 is closed, allowing a current to flow through each of the light fixtures, thereby illuminating a respective illumination device, such as a light bulb, installed into each of the light fixtures. The term "illumination device" may refer to any light-emitting device, such as an incandescent light bulb, a fluorescent light bulb, an LED light bulb, or almost any light-emitting device that uses electricity in order to provide illumination. In this arrangement, all three lights are illuminated by turning the light switch 100 ON, and all three lights are extinguished when the light switch 100 is turned OFF. There is no way to turn only one or two lights ON or OFF.

Figure 2:
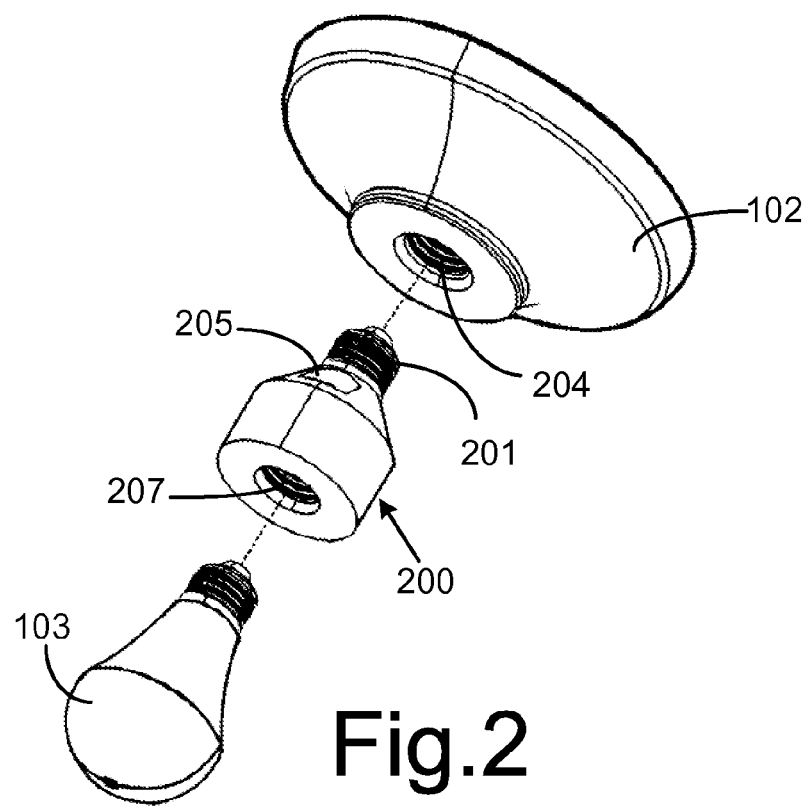
FIG. 2 is a perspective view showing how the present invention is to be installed onto a conventional light fixture.

With reference to FIG. 2, there is an exploded view of one embodiment of a lighting control adapter 200 in accordance with the teachings herein. Shown are a male base 201, a female socket 207, and an optional user interface 205. The lighting control adapter 200 is installed into fixture base 102, which is controlled by light switch 100, and used to energize and de-energize illumination device 103. Fixture base 102 is typically comprised in an existing light fixture commonly found in homes and businesses for receiving light bulbs and providing home and/or business illumination. The lighting control adapter 200 is used to control illumination device 103 using techniques that will be explained in detail later herein.

Lighting control adapter 200 is installed into an existing fixture base 102 typically by threading male base 201 into the female socket 204 of the fixture base 102. Male base 201 typically comprises threads that mate with grooves formed inside of female socket 204. However, in other embodiments, male base 201 may comprise other well-known mechanisms that allow male base 201 to connect to female socket 204. In certain embodiments, the male base 201 and the female socket 204 comprises a screw-cap type fitting with various size options, such as, but not limited to, E10, E14, E26 and E27. In other embodiments, the male base 201 and female socket 207 is a combination of, but not limited to, bayonets, Edison screw-cap, or GU24 type fittings. The optional user interface 205 allows a user to select whether the illumination device 103 turns ON or OFF during an initial power up from a light switch 100 and may further be used to program lighting control adapter 200 to energize and de-energize illumination device 103 as lighting control adapter 200 senses one or more cyclic voltage changes within a predetermined time period, herein referred to as a "power toggle". A cyclic voltage change may be defined as a transition from a first voltage to a second voltage and then back to the first voltage within a predetermined time period, typically on the order of several hundred milliseconds. In one embodiment, a cyclic voltage change is defined as a voltage changing from "high" voltage (e.g., 120 VAC) to "low" voltage (zero VAC) and back to "high" voltage within 500 milliseconds.

Figure 3:
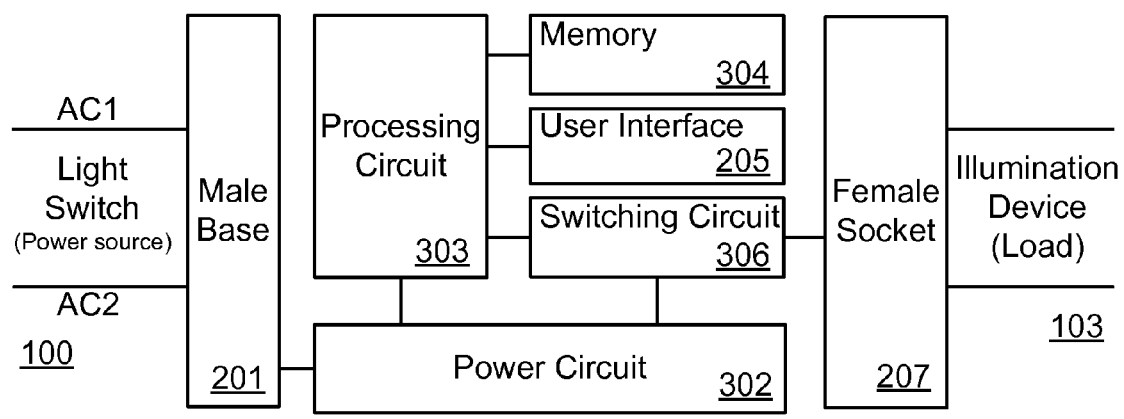
FIG. 3 is a block diagram showing an exemplary embodiment of the present invention.

With reference to FIG. 3, there is depicted a functional block diagram of one embodiment of the lighting control adapter 200. In another embodiment, the functional block diagram shown in FIG. 3 represents electrical lighting circuitry that may be used in a variety of embodiments. Specifically, FIG. 3 shows male base 201, power circuit 302, processing circuit 303, memory 304, user interface 205, switching circuit 306, and female socket 207. It should be understood that not all of the functional blocks shown in FIG. 3 are required for operation of lighting control adapter 200 and that the functional blocks may be connected to one another in variety of ways.

Male base 201 is used to physically secure lighting control adapter 200 to a mating socket with a power source, thereby providing a source of power to lighting control adapter 200, typically in the form of an alternating current at 120 volts. Male base 201 is typically installed into a common, existing light socket found ubiquitously in virtually every modern structure. Male base 201 typically comprises threads that are used to mate with grooves formed inside of female socket 207. Female socket 207 typically comprises internal grooves for physically securing illumination device 103 to lighting control adapter 200 and for selectively providing power to illumination device 103.

Power circuit 302 may be used to convert high voltage received via male base 201 to a lower operating voltage for use by other components, such as memory 304 and/or processing circuit 303. In another embodiment, these other components are powered by a battery, for example, one or more AA batteries. In this case, voltage received via male base 201 is not used to power internal components of lighting control adapter 200. Power circuit 302 may comprise any known methods of converting voltage from one value to another, such as a transformer, a bridge rectifier, one or more capacitors, and/or one or more voltage dividing circuits. Non-limiting examples of power circuit 302 comprise an AC to DC converter and/or a voltage regulator. Furthermore, power circuit 302 may comprise a voltage sustaining circuit, which provides a temporary source of power for other components of lighting control adapter 200, such as processing circuit 303, to continue its operation during power toggles. Such voltage sustaining circuitry is well known in the art and may comprise a capacitor.

Processing circuit 303 is configured to provide general operation of lighting control adapter 200 including detecting power as it is initially applied to male base 201, detecting power toggles, and instructing switching circuit 306 when to energize or de-energize illumination device 103. In one embodiment, processing circuit 303 comprises a microprocessor or microcontroller for executing processor-readable instructions stored in memory 304. One example of such a processor is a PIC12C508 microcontroller manufactured by Microchip, Inc. of Chandler, Ariz. However, in other embodiments, processing circuit 303 could comprise one or more discreet circuits and/or integrated circuits, such as one or more transistors, flip-flops, logic circuits, etc. Such circuitry/components are well known to those skilled in the art. For example, in one embodiment, a typical "D" flip-flop could be used as shown. In this arrangement, when power is first applied to male base 201, low-voltage power is initially applied to Vcc, either by a battery (not shown) or from power circuit 302, and the Q output is put into a "high" state, representing a digital "1", due to the SET input of the flip flop being coupled to Vcc. The Q output is coupled to the switching circuit 306, where the digital "1" may cause the switching circuit 306 to apply power to illumination device 103. If power is toggled via light switch 100, the voltage will change at flip flop CLOCK input from "high" to "low" then back to "high". If the toggle does not occur fast enough, the low-voltage power may be lost at Vcc, causing a reset of the flip flop. The speed at which the toggle must occur may be dictated by a voltage/current storage device, such as a capacitor or an inductor. If the toggle does occur fast enough, the Q output changes from "high" to "low", causing the switching circuit to de-energize the illumination device 103. Each subsequent power toggle causes the Q output to change state, i.e., change from "high" to "low" or "low" to "high" and, in turn, causing switching circuit 306 to either energize or de-energize illumination device 103.

Processing circuit 303 may detect power toggles occurring at male base 201 by sensing a reduced voltage proportional to the voltage at male base 201, provided by power circuit 302. In this embodiment, processing circuit 303 may use threshold crossing techniques, voltage level comparisons, or other techniques known in the art to determine when a power toggle has occurred, in conjunction with timing information to determine if a cyclic voltage change occurring at male base 201 has occurred within a predetermined time period. The reduced voltage may be proportional to the voltage present at male base 201. Processing circuit 303 may determine the occurrence of power toggles indirectly, by receiving a signal from some other component of lighting control adapter 200, such as power circuit 302, that is tasked for determining cyclic voltage changes occurring at male base 201. In yet another embodiment, processing circuit 303 may receive one or more signals from some other component(s) indicative of the voltage provided to male base 201. For example, a transformer may be used to provide a stepped-down voltage to an input of processing circuit 303, so that processing circuitry detects power toggles. Processing circuit 303, of course, could use one or more other well-known methods to detect power toggles.

Memory 304 comprises one or more information storage devices, such as RAM, ROM, EEPROM, UVPROM, flash memory, Memory Stick, SD memory, XD memory, thumb drive, or virtually any other type of memory device. Memory 304 is used to store the processor-readable instructions for operation of lighting control adapter 200 as well as any information used by processing circuit 303, such as a table of switch positions and associated actions to either energization or de-energization illumination device 103 (an example of such shown in FIG. 6) and/or one or more predetermined time periods, such as a predetermined time period for determining if a power toggle has occurred (e.g., a maximum time period during which voltage is cycled from high voltage to low/no voltage and back to high voltage at male base 201). In one embodiment, memory 304 comprises one or more discreet circuits and/or integrated circuits, such as one or more transistors, flip-flops, etc. Such circuitry/components are well known to those skilled in the art and can be configured to store information pertaining to the lighting control adapter 200 settings.

In another embodiment, memory 304 is not used, and the predetermined time period to declare a power toggle may be inherently defined by a time needed to de-energize one or more of the components of lighting control adapter 200, such as processing circuit 303. For example, the power circuit 302 may comprise a capacitor that is charged when voltage is applied to male base 201 for any length of time. The capacitor may provide a temporary source of power to processing circuit 303 and other components during a power toggle if the low/no voltage time period during power toggles does not exceed the predetermined time period, typically on the order of tens or hundreds of milliseconds. The predetermined time period may be related to an RC time constant as a function of a value of the capacitor and the resistive load of the processing circuit 303 and other components receiving the temporary power. During a cyclic voltage change, if the time that the voltage at male base 201 is in the no/low voltage state for less than the time period, the processing circuit will consider the cyclic voltage change to be a power toggle. If the no/low voltage state is maintained for a time period greater than the predetermined time period, the processing circuit 303 will turn OFF and reset.

User interface 205 may be used to program lighting control adapter 200. Programming may comprise instructing lighting control adapter 200 whether to supply power to illumination device 103 or not when light switch 100 is initially turned to the "ON" position, and/or how lighting control adapter 200 energizes, re-energizes, de-energizes, or keeps de-energized power to female socket 207 as one or more power toggles are detected. The term "re-energize" may refer to energizing illumination device 103 from a de-energized state during power toggles. For example, in some embodiments, if illumination device 103 is in an energized state prior to a power toggle, illumination device 103 may briefly lose power during the "OFF" period of a power toggle, because power to male base 201 is briefly interrupted by light switch 100 during power toggles. As power is re-applied to male base 201 during the transition from "no power" to "power" during a power toggle, the illumination device 103 is re-energized by lighting control adapter 200 from a brief period of de-energization to an energized state.

With regard to initial operation of lighting control adapter 200 when light switch 100 is first turned ON, user interface 205 may provide an indication to processing circuit 303 of whether to energize or keep the illumination device 103 de-energized upon application of an initial voltage to lighting control adapter 200 via light switch 100, for example, when turning light switch 100 from the "OFF" position to the "ON" position. In another embodiment, lighting control adapter 200 is manufactured to turn ON at the first instance of power applied to it by light switch 100 by default, and user interface 205 is not used instruct processing circuit 303 whether to energize or de-energize illumination device 103 upon the application of initial power from light switch 100.

With regard to operation of lighting control adapter 200 as power toggles are detected after initial power has been applied to lighting control adapter 200, user interface 205 may allow a user to program lighting control adapter 200 to energize, re-energize, de-energize, and/or keep de-energized illumination device 103 as power toggles are detected. Programming may comprise setting user interface 205 to a desired position, indicating a number of toggles needed to energize and/or de-energize the illumination device 103. For example, if user interface 205 comprises a DIP switch having 2 ON-OFF switches, a total of 4 combinations of positions are possible. If each switch is placed into the "ON" position (e.g., a "fourth" position), it may indicate to processing circuit 303 that the lighting control adapter 200 should energize (or re-energize) illumination device 103 upon detection of 4 power toggles after light switch 100 is turned to the "ON" position. Conversely, user interface 205 may be used to indicate to processing circuit 303 a number of power toggles needed to de-energize (or keep de-energized) the illumination device 103.

Alternatively, or in addition to the above, user interface 205 may be used to place lighting control adapter 200 into a mode of operation where lighting control adapter 200 may be "remotely" programmed via power toggles, e.g., a user does not have to physically access lighting control adapter 200 in order to program lighting control adapter 200. For example, a user may install the lighting control adapter 200 in a hard-to-reach location such as high ceiling or fixtures with secured covers. This mode of operation may be referred to herein as the "remote programming capability mode". The remote programming capability mode may be configured upon setting user interface 205 into a predetermined state, such as all switches being placed into the "ON" position, all switches being placed in the "OFF" position, as shown in FIG. 7, alternating the switches between ON and OFF, or some other combination. Thereafter, if processing circuit 303 detects a predetermined number of power toggles within a predetermined time period, lighting control adapter 200 enters a programming mode, where lighting control adapter 200 may be set to energize or de-energize illumination device 103 based on a number of power toggles detected after entering the programming mode. For example, after user interface 205 has been placed into a position indicating remote capability programming mode, a user may program lighting control adapter 200 by first applying initial power to lighting control adapter 200 via light switch 100, then toggling light switch 100 five times within a period of two seconds. Processing circuit 303 detects the power toggles and in response, may cause the illumination device 103 to blink one or more times, e.g., turn OFF, then back ON within a short time period such as one second, indicating that lighting control adapter 200 is ready to be programmed. Subsequently, the user may toggle light switch 100 a number of times indicative of the number of power toggles needed to turn the illumination device 103 ON or OFF. After a brief delay, such as three seconds, processing circuit 303 may cause the illumination device 103 to blink one or more times again, indicating successful receipt of the programming instructions, e.g., a number of power toggles needed to turn illumination device 103 ON or OFF. Lighting control adapter 200 may then automatically exit the programming mode and monitor the voltage from power circuit 302 to detect power toggles.

User interface 205 typically comprises one or more ON/OFF switches such as, but not limited to, one or more individual switches, a dual in-line package (DIP) switch comprising one or more ON/OFF switches, one or more rotary switches, one or more push button switches, one or more reed switches (controlled by bringing a magnet in proximity to the reed switch), infra-red operated switch, or almost any variety of switch type. In some embodiments, user interface 205 comprises two or more different kinds of switches. For example, a first pushbutton switch could be used to set lighting control adapter 200 to turn ON illumination device 103 when power is first applied to lighting control adapter 200, while a rotary switch is used to provide a code to processing circuit 303, instructing processing circuit 303 when to apply and remove power to/from illumination device 103 as power toggles are detected.

In an embodiment where user interface 205 comprises one or more ON/OFF switches, each switch either applies or removes a relatively low voltage, such as 5 volts DC to processing circuit 303. The combination of "1's" and "0's" applied to processing circuit 303 via the switches is a code that processing circuit 303 uses to determine when to apply power to illumination device 103.

Figure 4:
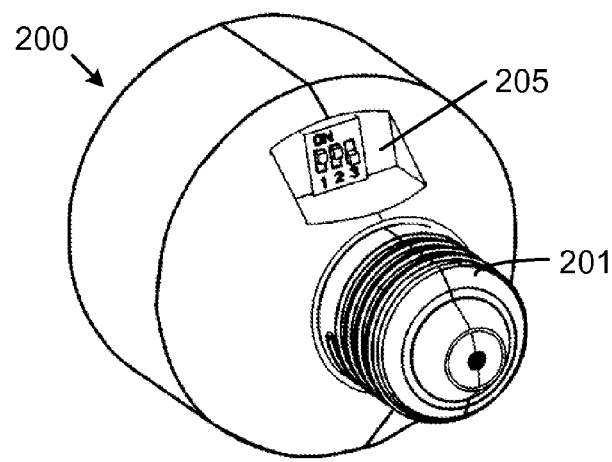
FIG. 4 is a perspective view of the present invention showing the male base and the user interface switches.

For example, in an embodiment using 3 switches in a DIP switch arrangement, a total of 8 possible combinations are possible from the DIP switch. Codes 000 and 111 may be reserved to instruct processing circuit 303 to enter the remote programming capability mode, while codes 001 through 110 may each instruct processing circuit 303 when to apply and remove power to/from illumination device 103. For example, the far left switch shown in FIG. 4, representing the far left digit of a 3-digit code, may indicate whether power should be applied to illumination device 103 upon initial power from light switch 100 or not. Switches 2 and 3 represent 4 possible combinations of outputs ($2^2$). Thus, if switch 2 is set to a digital "1" and switch 3 set to digital "0", power may be applied to illumination device 103 upon processing circuit 303 detecting 2 power toggles ($10_{Base2}=2_{Base10}$) after power is initially applied to lighting control adapter 200 via light switch 100.

According to another embodiment, each switch of user interface 205 is used individually to instruct processing circuit 303 whether to apply power to illumination device 103 or not. FIG. 6 shows a table of switch positions and their associated preconfigured ON/OFF sequences that effect energization/de-energization of illumination device 103. The preconfigured ON/OFF sequence determines whether the load turns ON or OFF during initial power up and in the event of a power toggle sensed thereafter. In this particular embodiment, user interface 205 comprises a three-switch DIP switch, as shown in FIG. 4. In this particular embodiment, the first switch of the DIP switch determines if illumination device 103 will turn ON or remain OFF when light switch 100 is initially placed into the "ON" position. Illumination device 103 will remain ON or OFF as long as the light switch 100 is in the "ON" position.

The second and third switches of the DIP switch, in this embodiment, determine if the illumination device 103 will turn ON or OFF upon the detection of one or more power toggles by processing circuit 303. For example, if the second switch is set to "OFF" and the third switch is set to "ON" positions, either Mode 1 or Mode 5 is selected, as shown in the chart of FIG. 6, depending on whether lighting control adapter 200 is programmed to provide power to illumination device 103 upon initial power from light switch 100 (Mode 5) or not (Mode 1). If in Mode 1, power is not supplied to illumination device 103 upon initial power from light switch 100, i.e., placing light switch 100 into an "ON" position. Upon detection of a first power toggle by processing circuit 303, e.g., a user turning light switch 100 from the "ON" position to the "OFF" position and then back to the "ON" position within a predetermined time period, which causes voltage sensed at male base 201 to change from high voltage to low or no voltage, and back to high voltage, power is still not applied to illumination device 103, in accordance with Mode 1 in the column labeled "$1^{st}$ Toggle". Upon detection of a subsequent power toggle by processing circuit 303, power is applied to illumination device 103 as shown in Mode 1, in the column marked "$2^{nd}$ Toggle". If processing circuit 303 detects a third power toggle, the cycle will repeat with power being removed from illumination device 103, as indicated in Mode 1, in the column marked "$1^{st}$ Toggle". In another embodiment, after a third power toggle is detected, the cycle repeats by following the instruction in the column marked "Switch ON".

The switching circuit 306 is used to receive one or more signals from processing circuit 303 to energize, re-energize, de-energize, and/or keep de-energized illumination device 103, using circuitry that is well known in the art, such as one or more transistors, relays, triacs, etc. In one embodiment, voltage received at male base 201 is applied to female socket 207 upon receipt of an energization signal from processing circuit 303. In another embodiment, a different voltage is applied to female socket 207, such as a reduced voltage and/or a DC voltage supplied by power circuit 302.

With reference to FIG. 4, there is depicted a lighting control adapter 200 having a male base 201 and a user interface 205. More specifically, the lighting control adapter 200 is shown with a screw base male base 201, typically E27 or E26 and a three-switch DIP switch as user interface 205.

In one embodiment, user interface is not used. In this embodiment, the lighting control adapter 200 is manufactured, by default, to be in the remote programming capability mode or preconfigured to settings such as, but not limited to, modes depicted in FIG. 6)

FIG. 5 is a flowchart illustrating one method for "remote" programming of lighting control adapter 200, as opposed to using user interface 205 to program lighting control adapter 200 during initial power-up and/or as power toggles are detected. This method may be desirable in cases where lighting control adapter 200 is installed into hard-to-reach or hard-to-access light fixtures, for example, a light fixture located within a high ceiling where a ladder is required to access lighting control adapter 200. The method is implemented by processing circuit 303 executing processor-executable instructions stored in memory 304, or it may be implemented in hardware without the use of a microprocessor and/or memory, or a combination of both. It should be understood that in some embodiments, not all of the steps shown in FIG. 5 are performed, and/or the order in which the steps are carried out may be different. It should be further understood that some minor method steps have been omitted for purposes of clarity.

At block 500, user interface 205 is placed into a predetermined position that indicates a desire by a user to place lighting control adapter 200 into the remote programming capability mode. For example, all switches of a multi-switch user interface could be placed in the "1" or "ON" position, and/or be placed in the "0" of "OFF" position. In an embodiment where lighting control adapter 200 lacks user interface 205, lighting control adapter 200 may be manufactured and/or configured to the remote programming capability mode, and block 500 may not need to be performed.

At block 502, a user of lighting control adapter 200 installs lighting control adapter 200 into light fixture 102, such as an existing light fixture or socket, and further installs illumination device 103 into female socket 207. It is assumed that power to the light fixture 102 is OFF, and that power to light fixture 102 is controlled by light switch 100.

At block 504, after installation, initial power is applied to lighting control adapter 200 via light switch 100 being placed into an "ON" position. Processing circuit 303 may apply power to illumination device 103, via switching circuit 306, in accordance with lighting control adapter 200 being previously programmed.

At block 506, processing circuit 303 enters a programming mode after detecting a number of power toggles received by male base 201 equal to a predetermined number of toggles needed to place lighting control adapter 200 into a programming mode. The number of power toggles needed to place lighting control adapter 200 into the programming mode may be stored in memory 304. The programming mode allows a user to set the number of toggles needed to turn illumination device 103 ON or OFF after initial power has been applied to lighting control adapter 200. In one embodiment, upon entering the programming mode, processing circuit 303 causes illumination device 103 to "cycle", e.g., turn OFF and then ON within a predetermined time period, one or more times to indicate that lighting control adapter 200 has successfully entered the programming mode, awaiting programming instructions from the user via power toggles.

Once in the programming mode, a user can refer to the table of FIG. 6 for a desired sequence to control illumination of illumination device 103 based on initial power ON and subsequent power cycles. Although the table in FIG. 6 illustrates six possible modes of operation for a user interface comprising three switches, it should be understood that fewer, or a greater, number of modes could be defined in the alternative, related to the number of switches used in user interface 205. For example, if user interface 205 comprises 2 switches, a total of 4 possible combinations are possible. If one of the combinations is reserved for programming mode, 3 modes of operation could be defined.

The table in FIG. 6 illustrates the state of lighting control adapter 200 at initial power up, and after one or more power toggles are detected by processing circuit 303. For example, the user may select Mode 4, where the table indicates that lighting control adapter 200 will operate to turn illumination device 103 ON after application of initial power from light switch 100, will turn illumination device 103 OFF upon detection of a first power toggle, and will keep illumination device 103 turned OFF upon detection of a second power toggle detected. In one embodiment, upon the occurrence of a third power toggle, lighting control adapter 200 performs the instruction found in the column labeled "Switch ON", where the cycle repeats for detection of fourth or more power toggles detected.

At block 508, once the user has selected one of the modes in the table, the user toggles light switch 100 from the "ON" position to the "OFF" position and back to the "ON" position within a short time frame, for example 3 seconds, in order to program lighting control adapter 200 in accordance with the selected mode of operation. In another embodiment, the number of ON-OFF-ON cycles indicates a number of power toggles needed to turn the illumination device 103 ON or OFF. Toggling light switch 100 toggles power to lighting control adapter 200, which is detected by processing circuit 303. For example, in one embodiment where a user has selected Mode 3, the user may toggle light switch 100 three times.

In one embodiment, after a brief delay, such as three seconds, processing circuit 303 may cause the illumination device 103 to blink, or cycle power, one or more times, indicating successful receipt of the programming instructions, e.g., a number of power toggles needed to turn illumination device 103 ON or OFF. Lighting control adapter 200 may then automatically exit the programming mode and monitor the voltage from power circuit 302 to detect power toggles.

In another embodiment, processing circuit 303 may provide an indication to the user that the programming instructions were received successfully by cycling power to illumination device 103 in accordance with the mode number selected or in accordance with the number of power toggles needed to turn illumination device 103 ON or OFF. Thus, in this embodiment, if mode 3 was chosen by the user, processing circuit 303 causes illumination device 103 to turn OFF then ON three times. Thereafter, illumination device 103 is controlled in accordance with the information of the table shown in FIG. 6 and stored in memory 304 as subsequent initial power and power toggles are detected by processing circuit 303.

At block 510, processing circuit 303 detects that the user has toggled power to lighting control adapter 200 a number of times and determines how to energize, re-energize, de-energize, and/or keep de-energized illumination device 103 in accordance with the number of power toggles detected and mode selected by the user, or by the number of times needed to turn illumination device 103 ON or OFF. Memory 304 stores information relating to the table in FIG. 6, so that when processing circuit 303 determines a particular mode of operation via the detected power toggles applied to lighting control adapter 200, it energizes, re-energizes, de-energizes, and/or keeps de-energized illumination device 103 in accordance with the instructions in the table of FIG. 6, stored in memory 304.

FIG. 8 is a flowchart illustrating another method for controlling illumination of illumination device 103 in an embodiment where user interface 205 comprises a single, two-position switch. The method is implemented by processing circuit 303 executing processor-executable instructions stored in memory 304, or it may be implemented in hardware without the use of a microprocessor and/or memory, or a combination of both. It should be understood that in some embodiments, not all of the steps shown in FIG. 8 are performed, and/or the order in which the steps are carried out may be different. It should be further understood that some minor method steps have been omitted for purposes of clarity.

At block 800, a user of lighting control adapter 200 installs lighting control adapter 200 into light fixture 102, such as an existing light fixture or socket, and further installs illumination device 103 into female socket 207. It is assumed that power to the light fixture 102 is OFF, and that power to light fixture 102 is controlled by light switch 100.

At block 802, the user programs lighting control adapter 200 either by placing user interface 205 into, in this embodiment, into an "ON" position, which provides a relatively low voltage to processing circuit 303 after power has been applied to lighting control adapter 200, or by remote programming as described by the flow chart of FIG. 5. In this embodiment, placing the switch to the "ON" position is an indication to processing circuit 303 that the user would like the lighting control adapter 200 to provide power to illumination device 103 upon an initial supply of power from light switch 100. In an alternative embodiment, turning the switch to the "ON" position is an indication to processing circuit 303 that the user would like the lighting control adapter 200 keep illumination device 103 OFF upon an initial supply of power from light switch 100 to lighting control adapter 200. The state of the user interface may be stored by processing circuit 303 in memory 304.

At block 804, the user applies power to lighting control adapter 200, typically in the form of 120 VAC, by turning light switch 100 to the "ON" position. This causes power circuit 302 to supply one or more low-voltages to components within lighting control adapter 200, such as processing circuit 303, memory 304, etc.

At block 806, processing circuit 303 determines whether to turn illumination device 103 ON or to keep it OFF, by determining the state of user interface 205, in this case, in the "ON" position. In an embodiment where lighting control adapter 200 does not have a user interface 205, processing circuit 303 reads memory 304 to determine whether to energize illumination device 103 when initial power has been supplied to lighting control adapter 200 or not.

At block 808, processing circuit 303 determines whether power should be applied to illumination device 103 or not, based on the state of user interface 205 and/or by the result of reading memory 304 at block 806. In one embodiment, the determination is accomplished by processing circuit 303 accessing memory 304, which stores an indication of whether an ON state of user interface 205 should result in power being applied to illumination device 103 upon initial power being applied to lighting control adapter 200. In another embodiment, the determination is preset. In other words, lighting control adapter 200 is configured to apply power to illumination device 103 upon initial power from light switch 100 if the user interface 205 indicates it is in either the "ON" or "OFF" position, configurable during the design and/or manufacturing process, or by user programming.

If processing circuit 303 determines that power should be applied to illumination device 103 based on the state of user interface 205 and/or a reading of memory 304, then processing continues to block 810, where processing circuit 303 sends a signal to switching circuit 306 to apply power to illumination device 103. If processing circuit 303 determines that power should not be applied to illumination device 103 based on the state of user interface 205 and/or memory 304, then processing continues to block 812.

At block 812, processing circuit 303 determines whether any power toggles have been detected. If a power toggle has been detected, processing continues to block 814, where the illumination state of illumination device 103 is changed by processing circuit 303 sending a signal to switching circuit 306. For example, if illumination device 103 was OFF prior to detection of the power toggle, then processing circuit 303 would send a signal to switching circuit 306 that causes switching circuit 306 to apply power to illumination device 103. If illumination device 103 was ON prior to detection of the power toggle, then processing circuit 303 would send a signal to switching circuit 306 that causes switching circuit 306 to remove power from illumination device 103. If a power toggle has not been detected at block 812, processing circuit 303 continues to wait for a power toggle, shown as repeating to block 812 in FIG. 8.

Processing then continues back to block 812 to monitor for further power toggles. If power to lighting control adapter 200 is turned OFF at light switch 100, illumination device 103 is extinguished as well.

FIG. 9 is a flowchart illustrating another method for controlling illumination of illumination device 103 in an embodiment where user interface 205 comprises three, two-position switches, such as the one found in FIG. 4. The method is implemented by processing circuit 303 executing processor-executable instructions stored in memory 304, or it may be implemented in hardware without the use of a microprocessor and/or memory, or a combination of both. It should be understood that in some embodiments, not all of the steps shown in FIG. 9 are performed, and/or the order in which the steps are carried out may be different. It should be further understood that some minor method steps have been omitted for purposes of clarity.

At block 900, a user of lighting control adapter 200 installs lighting control adapter 200 into light fixture 102, such as an existing light fixture or socket, and further installs illumination device 103 into female socket 207. It is assumed that power to the light fixture 102 is OFF, and that power to light fixture 102 is controlled by light switch 100.

At block 902, the user programs lighting control adapter 200 either by placing each of the switches into, in this embodiment, into either an "ON" or "OFF" position in accordance with a chosen mode of operation, such as the chart shown in FIG. 6, or by remote programming as described by the flow chart of FIG. 5. In this embodiment, placing the switches into ON and/or "OFF" position provides an indication to processing circuit 303 of a particular way that power should be supplied to and removed from illumination device 103 either during initial power provided by light switch 100, by sensing power toggles, or both.

At block 904, power is initially applied to lighting control adapter 200 via light switch 100, typically in the form of 120 VAC, by turning light switch 100 to the "ON" position. This causes power circuit 302 to receive power from light switch 100 via male base 201. Power circuit 302 converts the power from male base 201 into one or more lower voltages for use by other components of lighting control adapter 200, such as processing circuit 303, memory 304 and/or switching circuit 306.

At block 906, processing circuit 303 determines the state of user interface 205, in this case the far-left switch in the "ON" position, the center switch in the "OFF" position, and the far-right switch in the "ON" position, indicative of Mode 5 as shown in FIG. 6.

At block 908, processing circuit 303 determines whether the state of user interface 205 (far-left switch) is an indication that power should be applied to illumination device 103 or not upon initial application of power to lighting control adapter 200. In one embodiment, the determination is accomplished by processing circuit 303 accessing memory 304, which stores information regarding one or more combinations of switch settings and whether power should be supplied to illumination device 103 based on the current switch settings detected by processing circuit 303. In this example, the first column of the chart of FIG. 6, Mode 5, indicates that power should be supplied to illumination device 103 upon initial power up.

If processing circuit 303 determines that power should be applied to illumination device 103 based on the state of user interface 205 (far-left switch) and/or information stored in memory 304, then processing continues to block 910, where processing circuit 303 sends a signal to switching circuit 306 to apply power to illumination device 103. If processing circuit 303 determines that power should not be applied to illumination device 103 based on the state of user interface 205 (far-left switch), then processing continues to block 912.

At block 912, processing circuit 303 determines whether a power toggle has been detected. If a power toggle has been detected, processing continues to block 914, where processing circuit 303 determines whether the state of user interface 205 (center switch) is an indication that power should be applied to illumination device 103 or not. In one embodiment, processing circuit 303 determines, from information stored in memory 304, whether power should be supplied to or removed from illumination device 103. Such information may comprise a state table as shown in FIG. 6. In the present example, column 2 labeled "$1^{st}$ Toggle" in the table in FIG. 6 indicates that power should not be applied to illumination device 103 after detection of a first toggle, i.e., that illumination device 103 should be extinguished.

At block 916, if processing circuit 303 determines that power should be applied to illumination device 103 based on the state of user interface 205 (center switch) and/or information stored in memory 304, then processing continues to block 918, where processing circuit 303 sends a signal to switching circuit 306 to apply power to illumination device 103. If processing circuit 303 determines that power should not be applied to illumination device 103 based on the state of user interface 205 (center switch), then processing continues to block 920.

At block 920, processing circuit 303 determines whether a power toggle has been detected. If a power toggle has been detected, processing continues to block 922, where processing circuit 303 determines whether the state of user interface 205 (far-right switch) is an indication that power should be applied to illumination device 103 or not. In one embodiment, processing circuit 303 determines, from information stored in memory 304, whether power should be supplied to or removed from illumination device 103. Such information may comprise a state table as shown in FIG. 6. In the present example, column 2 labeled "$2^{nd}$ Toggle" in the table in FIG. 6 indicates that power should not be applied to illumination device 103 after detection of a first toggle, i.e., that illumination device 103 should be extinguished.

At block 924, if processing circuit 303 determines that power should be applied to illumination device 103 based on the state of user interface 205 (far-right switch) and/or information stored in memory 304, then processing continues to block 926, where processing circuit 303 sends a signal to switching circuit 306 to apply power to illumination device 103. If processing circuit 303 determines that power should not be applied to illumination device 103 based on the state of user interface 205 (far-right switch), then processing continues to block 912.

If another power toggle is detected by processing circuit 303 at block 912, information in memory 304 is accessed to determine whether to supply or remove power to/from illumination device 103. In one embodiment, processing circuit 303 uses the information in the column named "Switch ON" to determine whether to energize, re-energize, de-energize, or keep de-energized illumination device 103. Thus, if a third power toggle is detected, the "Switch ON" column may be used to determine a state for illumination device 103, and if a fourth power toggle is detected, the column named "$1^{st}$ Toggle" may be used to determine a state for illumination device 103. This process may be repeated ad infinitum, or until the light switch 100 is turned to an "OFF" position, where the method is repeated beginning at block 904.

Figure 10:
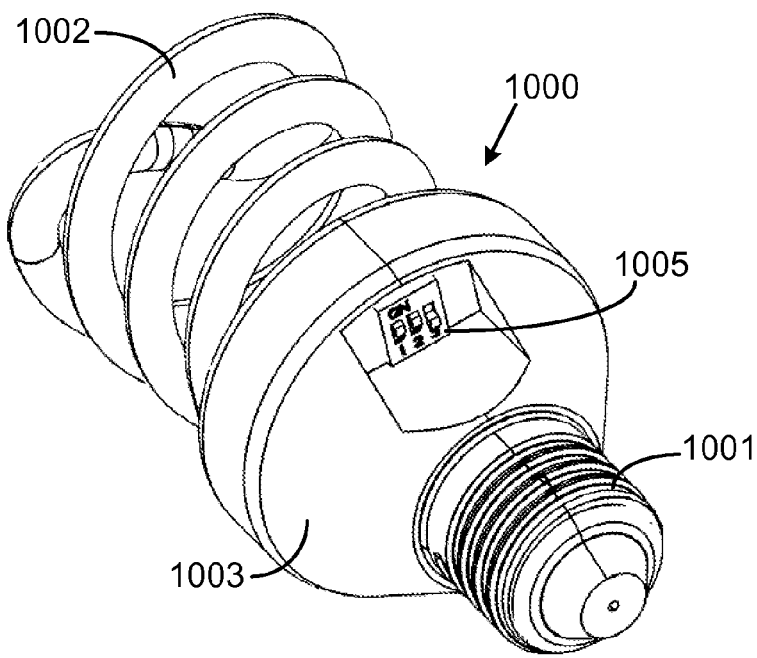
FIG. 10 is a perspective view of the present invention integrated as part of a CFL light bulb.
Figure 11:
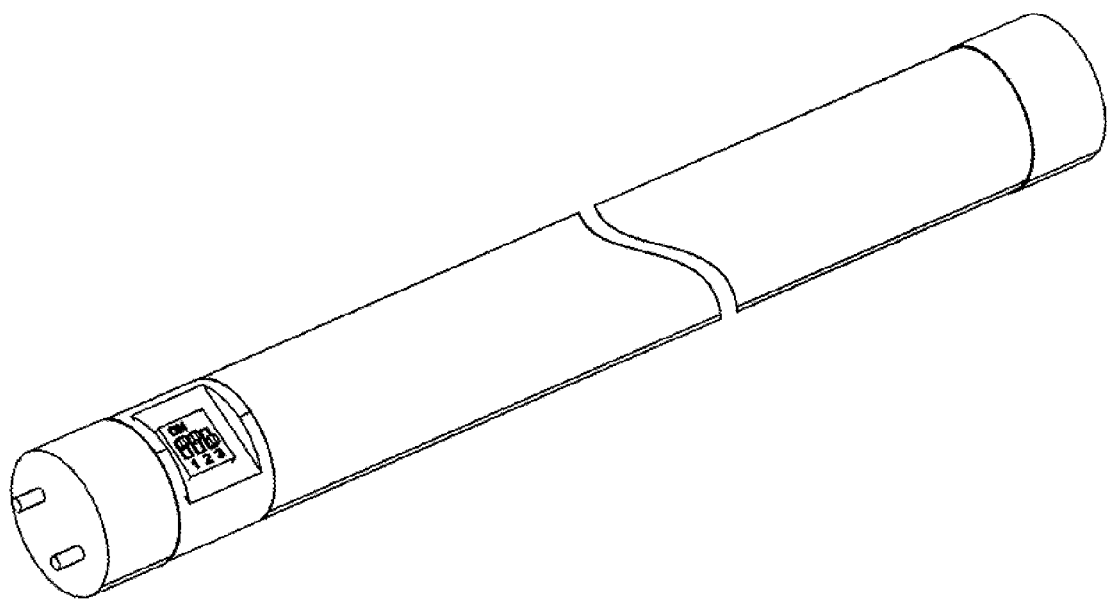
FIG. 11 is a perspective view of the present invention integrated as part of a linear fluorescent tube lamp.
Figure 12:
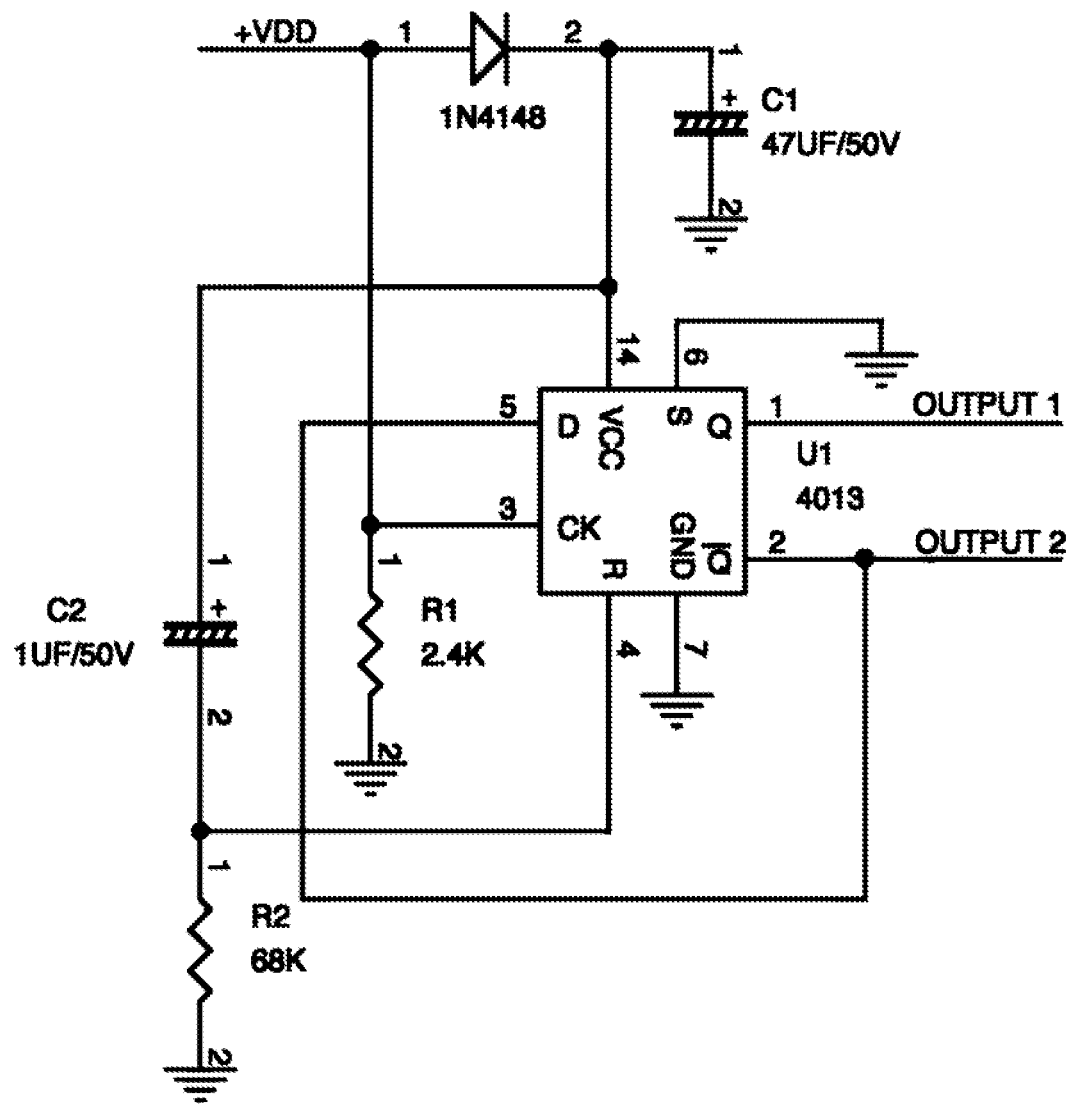
FIG. 12 is a schematic of one embodiment of a toggle detection circuit.

In another embodiment, the principles discussed thus far could be incorporated directly into an illumination device itself, as shown in FIG. 10, which illustrates an illumination device 1000 in the form of a compact fluorescent lamp (CFL). In other embodiments, the methods and apparatus discussed previously herein could be incorporated into other types of illumination devices, such as linear tube lamp (as shown in FIG. 11), incandescent lights, LED lights, fluorescent lights, etc.

In one embodiment, illumination device 1000 comprises user interface 1005 described above, a male base 1001, an illuminator 1002, in this embodiment in the form of a gas-filled tube (in other embodiments, one or more filaments, LEDs, etc.), and a housing 1003. As before, user interface 1005 allows the user to select whether illuminator 1002 becomes energized (thus generating light) or not during an initial application of voltage to male base 1001 and in response to cyclic voltage changes detected at the male base 1001.

In another embodiment, user interface 1005 is not used. Rather, illumination device 1000 is set into a default programming state during the manufacturing/configuring process. When illumination device 1000 is installed by a user into a light fixture, the user generally must program illumination device 1000 in accordance with the teachings previously discussed herein. In another embodiment where user interface 1005 is not used, illumination device 1000 is not programmable. Rather, it is pre-configured during the manufacturing process to either energize the illuminator 1002 upon application of voltage to male base 1001 and then de-energize the illuminator 1002 upon detection of a power toggle, or to remain de-energized upon application of voltage to male base 1001 and then energize the illuminator 1002 upon detection of a power toggle at male base 1001. The components needed to implement any of the embodiments discussed above may be the same or similar to the circuits described with respect to FIG. 3.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A lighting control comprising:
   a male base for physically attaching the lighting control to a light fixture and for receiving power from the light fixture via a light switch connected to the light fixture;
   a switching circuit for providing switchable power to an illumination device;
   a processing circuit, coupled to the switching circuit, for detecting one or more power toggles of the power received by the male base, and as part of a lighting group selectively turning the illumination device on/off based on the detection of one or more of the detected power toggles in a predetermined sequence including a sequence of power toggles to select the illumination device in the lighting group; and
   a user interface containing one or more switches for programming the lighting control to turn the illumination device on/off in responding to the predetermined sequence of the power toggles and coupled to the processing circuit to indicate to the processing circuit a plurality of toggles needed to turn the illumination device on as part of the lighting group.

2. The lighting control of claim 1, wherein detection of a power toggle causes the processing circuit to provide a signal to the switching circuit that causes the switching circuit to turn the illumination device on if the illumination device was not on prior to the power toggle, or to turn the illumination device off if the illumination device was on prior to the power toggle.

3. The lighting control of claim 1, wherein the user interface comprises at least one switch, wherein a remote programming capability mode is entered by the lighting control when the at least one switch is placed into a predetermined position, the remote programming capability mode for allowing remote programming of the lighting control.

4. The lighting control of claim 1, further comprising:
   a memory coupled to the processing circuit for storing a first number of power toggles needed to turn the illumination device on;
   wherein the processing circuit provides a signal to the switching circuit for the switching circuit to turn the illumination device on if the number of toggles detected matches the first number of power toggles stored in the memory.

5. The lighting control of claim 1, further comprising:
   a memory coupled to the processing circuit for storing an indication of a number of power toggles needed for the lighting control to enter into a programming mode of operation;
   wherein the processing circuit enters the programming mode upon detection of a number of power toggles equal to the indication.

6. The lighting control of claim 1, wherein the user interface is capable of assuming at least two states, wherein:
   in a first state, the processing circuit causes the switching circuit to turn the illumination device on when initial power is applied at the male base and to cause the switching circuit to turn the illumination device off when a power toggle is detected; and
   in a second state, the processing circuit causes the switching circuit to provide no power to the illumination device when initial power is applied at the male base and to cause the switching circuit to turn the illumination device on when a power toggle is detected.

7. The lighting control of claim 1, wherein the user interface comprises at least two switches, wherein the first switch provides an indication to the processing circuit whether to turn the illumination device on via the switching circuit upon initial power applied to the male base or to keep the illumination device turned off via the switching circuit upon initial power applied to the male base; and
   wherein the second switch provides an indication to the processing circuit of whether to turn the illumination device on via the switching circuit or turn the illumination device back on upon detection of a power toggle or to keep the illumination device turned off or to turn the illumination device off upon detection of the power toggle.

8. The lighting control of claim 5, wherein programming the lighting control comprises storing an indication in the memory of a number of power toggles needed to turn the illumination device on.

9. The lighting control of claim 5, wherein programming the lighting control comprises storing an indication in the memory of a number of power toggles needed to turn the illumination device off.

10. The lighting control of claim 1, wherein the user interface is further configured to cause the lighting control to enter a programming mode of operation if the user interface is placed into a predetermined configuration.

11. The lighting control of claim 10, further comprising a memory;
    wherein programming the lighting control comprises storing an indication in the memory of a number of power toggles needed to turn the illumination device on.

12. The lighting control of claim 10, further comprising a memory; wherein programming the lighting control comprises storing an indication in the memory of a number of power toggles needed to turn the illumination device off.

13. An electrical lighting control circuit, comprising:
    an input for receiving voltage from a light switch;
    an output turning on an illumination device;
    a switching circuit coupled to the output for switchably providing the voltage to the illumination device;
    a memory configured to store a number of power toggles needed to turn the illumination device on; and
    a processing circuit coupled to the switching circuit for detecting a number of power toggles and for providing a signal to the switching circuit for the switching circuit to turn the illumination device as part of a lighting group on upon detection of the number of power toggles equal to the number of power toggles stored in the memory in a predetermined sequence including a sequence of power toggles to select the illumination device in the lighting group and a user interface containing one or more switches for programming the lighting control to turn the illumination device on/off in responding to the predetermined sequence of the power toggles.

14. The electrical lighting control circuit of claim 13, wherein the processing circuitry compares the number of detected power toggles with the predetermined number of power toggles stored in the memory to determine whether or not to turn the illumination device on.

15. The electrical lighting control circuit of claim 13, further comprising a user interface for entering a number of power toggles needed to either turn the illumination device on, wherein the processing circuit stores the entered number of power toggles in the memory.

16. The electrical lighting control circuit of claim 13, wherein detection of a power toggle causes the processing circuit to provide a signal to the switching circuit that causes the switching circuit to turn the illumination device on if the illumination device was not turned on prior to the power toggle.

17. The electrical lighting control circuit of claim 13, wherein the memory is further configured to store an indication of a number of power toggles needed for the electrical lighting control circuit to enter into a programming mode of operation;
  wherein the processing circuit enters the programming mode upon detection of a number of power toggles equal to the indication stored in the memory.

18. The electrical lighting control circuit of claim 17, wherein programming the electrical lighting control circuit comprises storing an indication in the memory of the number of power toggles needed to turn the illumination device on.

19. The electrical lighting control circuit of claim 17, wherein programming the electrical lighting control circuit comprises storing an indication in the memory of the number of power toggles needed to turn the illumination device off.

20. The electrical lighting control circuit of claim 13, further comprising a user interface, wherein the user interface comprises at least one switch, and wherein a remote programming capability mode is configured by the electrical lighting control circuit when the at least one switch is placed into a predetermined position, the remote programming capability mode for allowing remote programming of the electrical lighting control circuit by applying one or more power toggles to the input.

21. An illumination device, comprising:
  an input for receiving voltage from a light socket;
  an illuminator for generating light;
  a switching circuit coupled to the illuminator for switchably turning the illuminator on;
  a processing circuit coupled to the switching circuit, for detecting one or more power toggles to the input and for providing a signal to the switching circuit for the switching circuit to turn the illuminator on upon detection of a power toggle in a predetermined sequence including a sequence of power toggles to select the illumination device in the lighting group; and
  a user interface containing one or more switches for programming the lighting control to turn the illumination device on/off in responding to the predetermined sequence of the power toggles and comprising at least two states, wherein:
    in a first state, the processing circuit causes the switching circuit to turn the illuminator on when initial power is applied to the input; and
    in a second state, the processing circuit causes the switching circuit to provide no power to the illuminator when initial power is applied at the input and to cause the switching circuit to turn the illuminator on when a power toggle is detected.

22. An electrical lighting control circuit, comprising:
  an input for receiving voltage from a light switch;
  an output turning an illumination device on;
  a switching circuit coupled to the output for switchably providing the voltage to the illumination device;
  a user interface containing one or more switches for programming the lighting control to turn the illumination device on/off in responding to the predetermined sequence of the power toggles and coupled to the processing circuit to indicate a number of toggles needed to turn the illumination device on; and
  a processing circuit coupled to the switching circuit for providing a first signal to the switching circuit for the switching circuit to turn the illumination device on upon detection of initial power applied to the input, and for providing a second signal to the switching circuit that causes the switching circuit to change an illumination state of the illumination device upon detection of a power toggle and in accordance with the number of toggles needed to turn the illumination device on in a predetermined sequence including a sequence of power toggles to select the illumination device in the lighting group.

23. The electrical lighting control circuit of claim 22, wherein the first signal to the switching circuit causes switching circuit to provide no power to the illumination device upon detection of initial power applied to the input, and the second signal to the switching circuit causes switching circuit to change an illumination state of the device upon detection of the power toggle and in accordance with the number of toggles needed to turn the illumination device on.

* * * * *